United States Patent [19]

Ehrlich

[11] Patent Number: 5,255,952
[45] Date of Patent: Oct. 26, 1993

[54] VAN DOOR STRUCTURE

[75] Inventor: Rodney P. Ehrlich, Monticello, Ind.

[73] Assignee: Wabash National Corporation, Lafayette, Ind.

[21] Appl. No.: 26,273

[22] Filed: Mar. 4, 1993

Related U.S. Application Data

[63] Continuation of Ser. No. 789,350, Nov. 8, 1991, abandoned.

[51] Int. Cl.$^5$ .............................................. B60J 5/04
[52] U.S. Cl. ................................ 296/146.13; 49/368; 160/117
[58] Field of Search ............. 296/146 R, 146 G, 146 I; 105/378; 49/367, 368, 366; 160/117, 119

[56] References Cited

U.S. PATENT DOCUMENTS

| | | | |
|---|---|---|---|
| 1,802,417 | 4/1931 | Fildes | 49/368 X |
| 1,811,312 | 6/1931 | Fildes | 49/368 X |
| 1,958,775 | 5/1934 | Williamson | 160/117 |
| 1,981,241 | 11/1934 | McWilliams et al. | 160/117 |
| 2,753,207 | 7/1956 | Forssell | 160/117 X |
| 2,879,558 | 3/1959 | Soddy | 105/378 X |
| 3,590,531 | 7/1971 | Childs | 49/368 |
| 3,653,155 | 4/1972 | de Brunyn, Jr. et al. | 49/368 X |

*Primary Examiner*—Dennis H. Pedder
*Attorney, Agent, or Firm*—Trexler, Bushnell, Giangiorgi & Blackstone, Ltd.

[57] ABSTRACT

A door structure, particularly for freight vans, includes a pair of oppositely pivotal door panels in which a first of the door panels overlaps and engages the second door panel in a sealed, closed position of both the door panels, and in which the first door panel includes first and second panel portions. The first, medial panel portion of the first door panel is pivotally mounted on the second panel portion and arranged to define the overlap of the second door panel to enable pivotal opening of the first panel portion from the overlapping closed position and thereafter to enable pivotal opening of the second door panel without requiring pivotal opening of the second panel portion of the first door panel. Thus constructed, either of the second door panel and the second panel portion of the first door panel can be independently, pivotally opened.

4 Claims, 2 Drawing Sheets

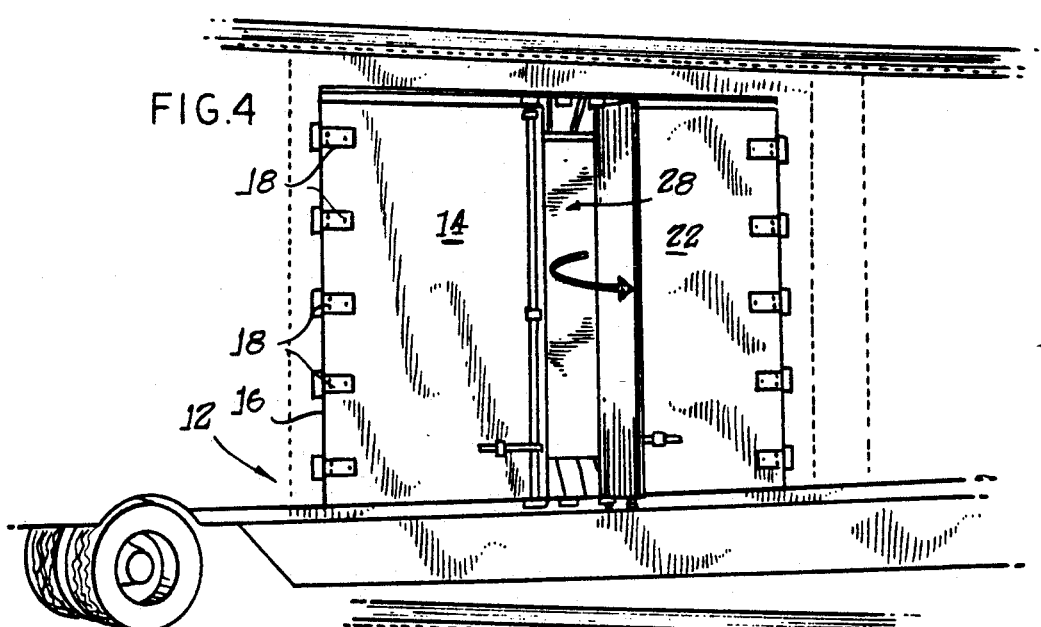
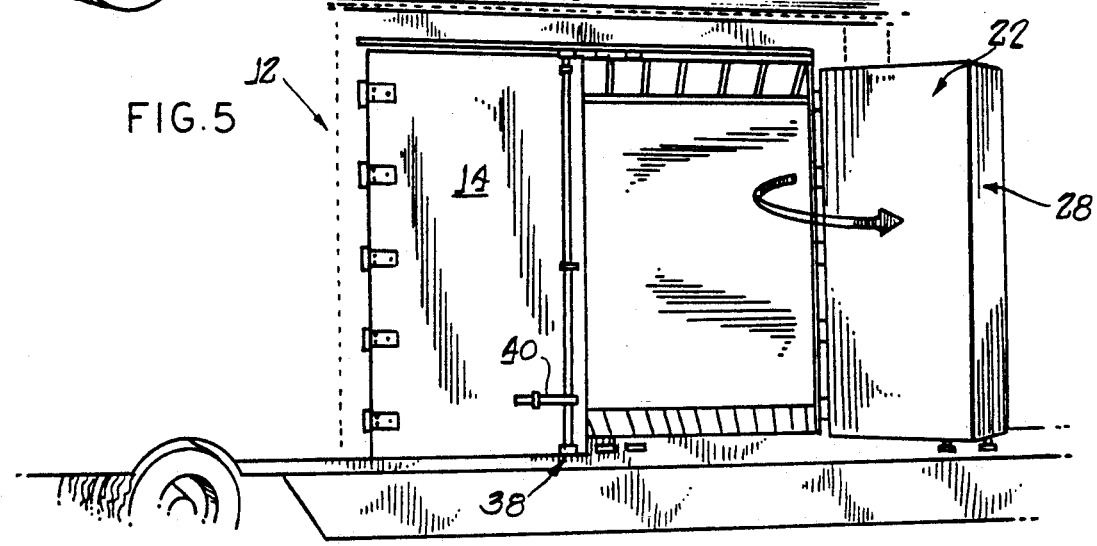
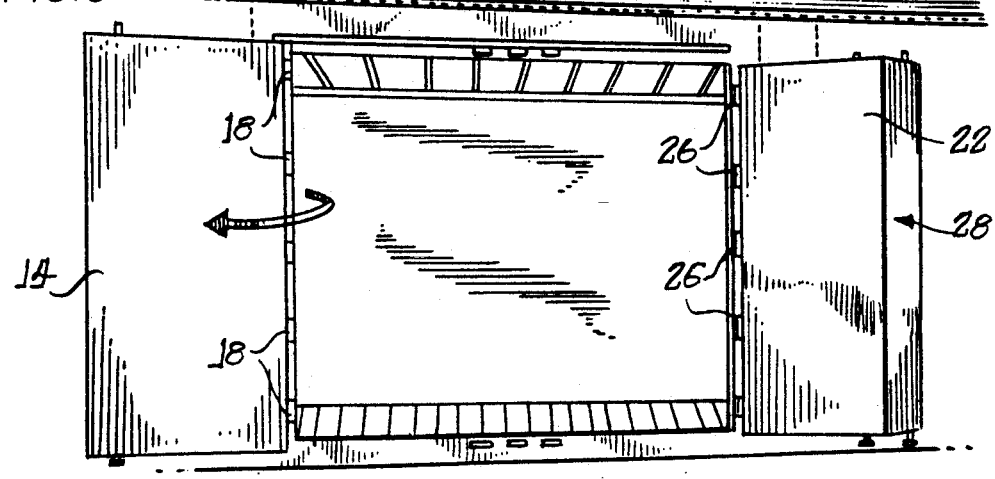

VAN DOOR STRUCTURE

This application is a continuation of application Ser. No. 07/789,350, filed Nov. 8, 1991, now abandoned.

BACKGROUND OF THE INVENTION

The present invention relates to door structures particularly for truck vans, and more particularly relates to door structures with separately hinged, multiple panels.

Typical large truck vans such as freight vans, are provided with large, side access doors to allow loading and unloading of large and irregular furniture items. In order to provide sufficiently large openings, such freight van doors have conventionally been arranged with two oppositely pivoting door panels each of which overlaps a medially located, stationary post member against with the two door panels overlap to provide sealing closure of the panels. In this arrangement, either door panel can be opened while the other door panel remains closed however, when both of the doors are opened the resulting access is obstructed by the center post without a time consuming effort to remove, and subsequently replace, the post.

These disadvantages are eliminated in the door structure in accordance with the present invention.

SUMMARY OF THE INVENTION

In accordance with the present invention, a door structure, particularly for freight vans, includes a pair of oppositely pivotal door panels in which a first of the door panels overlaps and engages the second door panel in a sealed, closed position of both the door panels, and in which the first door panel includes first and second panel portions. The first, medial panel portion of the first door panel is pivotally mounted on the second panel portion and arranged to define the overlap of the second door panel to enable pivotal opening of the first panel portion from the overlapping closed position and thereafter to enable pivotal opening of the second door panel without requiring pivotal opening of the second panel portion of the first door panel. Thus constructed, either of the second door panel and the second panel portion of the first door panel can be independently, pivotally opened.

In a preferred embodiment, the first panel portion includes a free, longitudinal edge which overlaps a free longitudinal edge of the second door panel in the overlapped closed position of the door panels. The free longitudinal edges of the first panel portion and the second door panel are spaced in parallel relation to the respective, oppositely aligned pivot bearing structures thereof. Uninterrupted access across both of the open door panels is achieved without removal of a central post.

BRIEF DESCRIPTION OF THE DRAWINGS

FIG. 4 is a fragmentary, perspective side view of the door structure of FIGS. 1-3 showing the initial opening thereof;

FIG. 5 is a view similar to FIG. 4 showing a progressive, intermediate opening of the door structure; and FIG. 6 is a view similar to FIGS. 4 and 5 showing complete opening of the door structure.

DESCRIPTION OF THE ILLUSTRATED EMBODIMENT

Figure 1:
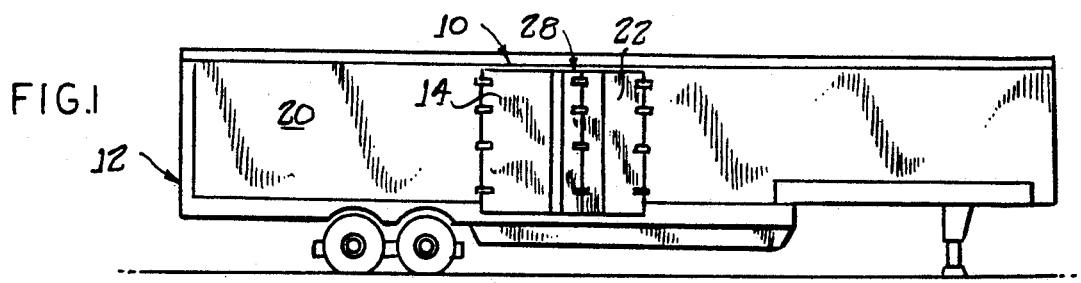
FIG. 1 is a schematic side view of a truck van showing installation of one embodiment of a door structure in accordance with the invention.

Referring to FIG. 1, a door structure in accordance with the present invention and designated by general reference character 10 is shown installed to provide side access on a typical freight van 12. As shown in comparison of FIGS. 2 and 4, the door structure 10 includes a left door panel 14, pivotally supported at the left edge 16 along a vertically arranged line of hinge structures 18 on the van side wall 20. The opposing, right door panel 22 is pivotally supported at its right edge 24 along a vertically arranged line of hinge structures 26. In the illustrated embodiment, a medial, abbreviated panel 28 is pivotally hinged and supported on the right panel 22 along its left edge 32. Thus in the illustrated arrangement as best shown in FIG. 3, the left edge 34 of the medial panel 28 overlaps the right edge 36 of the left door panel 14 to provide a weather-tight sealed engagement of the medial panel 28 thereon in the closed position of the three panels 14, 22, and 28 shown in FIG. 2. As further shown in FIG. 2, each of the door panels 14, 22, and 28 is provided with a respective conventional cam-lock and shaft structure, 38, 38, 38 and operating lever handle 40, 40, 40.

The door panels can be dimensioned to provide for example a left door panel 14 of approximately five feet wide, with the right panel 22 approximately four feet wide, and a medial panel 28 approximately one foot wide so that the fully open door structure provides an unobstructed access width of approximately 10 feet as shown in FIG. 6.

Referring to FIG. 4, operation to open either of the door panels 14 or 22 begins with first unlocking and opening the medial panel 28 so that the panel 28 disengages from the overlap of the panel 14 shown in FIG. 3, and pivots outwardly. Thereafter, unlocking and opening either the left panel 14 or the right panel 22 can be initiated since the medial panel 28 is carried with the outward pivot of panel 22, and the prior opening of the medial panel 28 as shown in FIG. 4 leaves the left panel 14 free from the overlap shown in FIG. 3.

Figure 2:
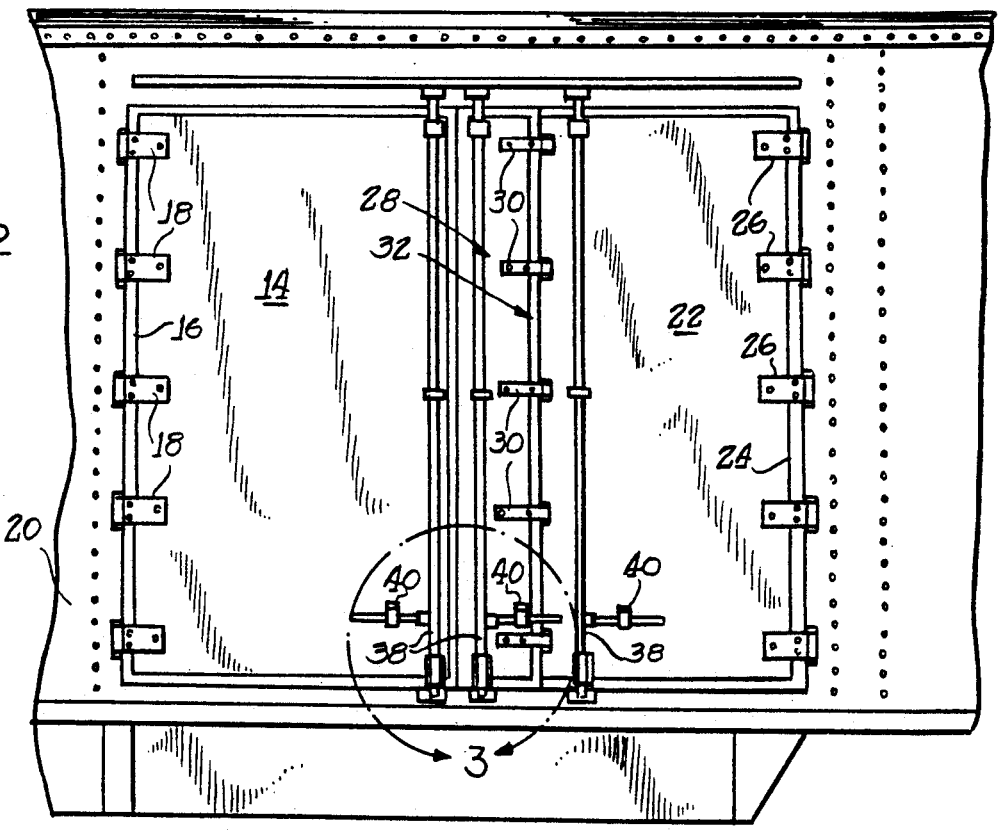
FIG. 2 is an enlarged, fragmentary view of the door structure shown in FIG. 1.
Figure 3:
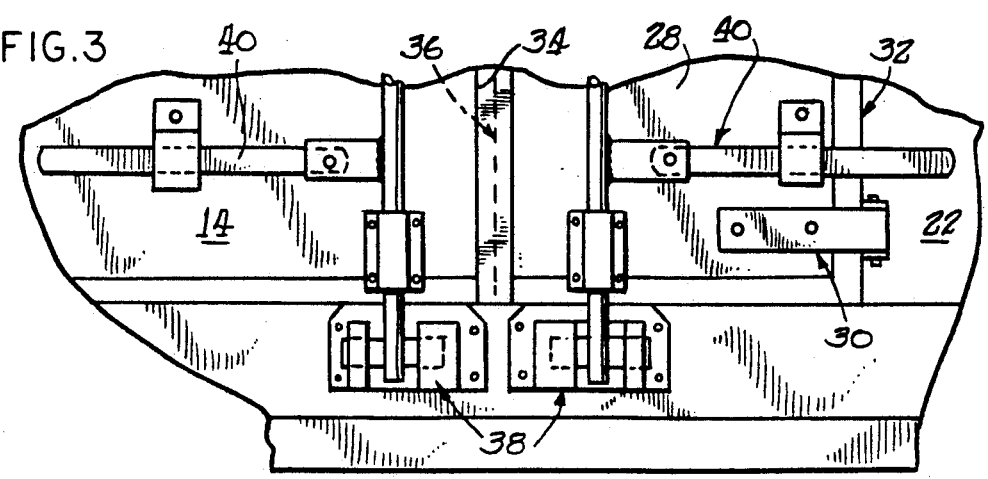
FIG. 3 is a fragmentary and enlarged view of portion of the door structure shown in FIGS. 1 and 2.

In the reverse operation to close both of the opened door panels 14 and 22, from the position shown in FIG. 6 to the fully closed position in FIG. 2, either of door panels 14 or 22 can be first closed, while the medial panel 28 is lastly closed so that it overlaps and seals the closed door panel 14 as shown in FIG. 3.

In summary, the construction in accordance with the present invention, including a medial panel, enables left and right opposing doors to independently open and close without the necessity of a central, obstructing post.

While particular embodiments of the door structure of the invention have been described herein, it will be obvious to those skilled in the design of door structures that changes on modifications in various aspects may be made without departing from the broad scope of the invention. Consequently, the scope of the invention is not limited by any particular embodiment but is defined by the appended claims and equivalents thereof.

The invention is claimed as follows:

1. A wheeled van structure having a front end and a back end for transportation of freight or the like, comprising: a cargo compartment partially defined by opposing elongate side walls; a door structure installed for access through one of said side walls, said door structure comprising: first and second oppositely pivotal door panels respectively located toward said front end and toward said back end; said first door panel overlapping and engaging the second door panel in a sealed, closed position of both said door panels; said first door panel includes not more than first and second panel portions thereof in which said first panel portion is pivotally mounted on said second panel portion and arranged to define said overlap of the second door panel, said second door panel consisting of a single panel portion having a width substantially equal to the combined width of said first and second panel portions; said first panel portion being abbreviated and having a width less than one-half a corresponding width of said second panel portion and first, second and third separately operable locking means respectively associated with said first panel portion, said second panel portion and said second panel for enabling pivotal opening of said first panel portion from said overlapping closed position and thereafter to enable pivotal opening of said second door panel without requiring pivotal opening of said second panel portion of said first panel.

2. A van structure according to claim 1 wherein said first panel portion includes a free, longitudinal edge thereon which overlaps a free longitudinal edge of said second door panel in said overlapping closed position thereof.

3. A van structure according to claim 2 wherein said free longitudinal edge is spaced parallel in relation to an oppositely aligned pivot bearing structure thereon defining said pivotal mounting of said first panel portion on said second panel portion.

4. A van structure according to claim 3 wherein said second panel portion includes a second pivot bearing structure arranged along a line parallel to said first mentioned pivot bearing structure of said first panel portion.

* * * * *